United States Patent
Chang et al.

(10) Patent No.: US 9,229,838 B2
(45) Date of Patent: Jan. 5, 2016

(54) MODELING AND EVALUATING APPLICATION PERFORMANCE IN A NEW ENVIRONMENT

(75) Inventors: Rong N. Chang, Pleasantville, NY (US); Chang-Shing Perng, Goldens Bridge, NY (US); Byung Chul Tak, Elmsford, NY (US); Chunqiang Tang, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 21 days.

(21) Appl. No.: 13/544,232

(22) Filed: Jul. 9, 2012

(65) Prior Publication Data

US 2014/0012561 A1 Jan. 9, 2014

(51) Int. Cl.
*G06F 9/45* (2006.01)
*G06F 11/34* (2006.01)

(52) U.S. Cl.
CPC ........ *G06F 11/3461* (2013.01); *G06F 11/3409* (2013.01); *G06F 2201/815* (2013.01); *G06F 2201/865* (2013.01)

(58) Field of Classification Search
CPC ............ G06F 17/5022; G06F 11/3409; G06F 11/346; G06F 2201/815; G06F 2201/8651
USPC ............................................. 703/22; 717/125
See application file for complete search history.

(56) References Cited

U.S. PATENT DOCUMENTS

| | | | |
|---|---|---|---|
| 7,248,603 B1 * | 7/2007 | Grunkemeyer et al. | 370/466 |
| 8,352,907 B2 * | 1/2013 | Kettley et al. | 717/106 |
| 2003/0139918 A1 * | 7/2003 | Hardwick et al. | 703/22 |
| 2013/0024843 A1 * | 1/2013 | Kutlu | 717/125 |

OTHER PUBLICATIONS

Kundu et al., "Application Performance Modeling in a Virtualized Environment" in proceedings of the IEEE High-Performance Computer Architecture, Jan. 2010, 10 unnumbered pages.
Zhang et al., "R-Capriccio: A Capacity Planning and Anomaly Detection Tool for Enterprise Services with Live Workloads" in Middleware 2007: Proceedings of the 8th ACM/IFIP/USENIX International conference on Middleware,Berlin, Heidelberg, 2007. Springer-Verlag, 20 unnumbered pages.
Doyle et al., "Model-Based Resource Provisioning in a Web Service Utility" in proceedings of the 4th USITS, Mar. 2003, 14 unnumbered pages.
Louis P. Slothouber, Ph.D, "A Model of Web Server Performance" in Proceedings of the 5th International World Wide Web Conference, 1996, 15 unnumbered pages.
Chandra et al., "Dynamic Resource Allocation for Shared Data Centers Using Online Measurements" in Proceedings of the 11th International Workshop on Quality of Service (IWQoS 2003) Jun. 2003. 18 unnumbered pages.

(Continued)

*Primary Examiner* — Eun Kim
(74) *Attorney, Agent, or Firm* — Louis Percello

(57) ABSTRACT

A method for evaluating the performance of an application when migrated from a first environment in which the application is currently executing to a second, different environment includes generating a virtual application that mimics the resource consuming behavior of the application, executing the virtual application in the second environment, and evaluating the performance of the virtual application in the second environment.

20 Claims, 4 Drawing Sheets

(56) References Cited

OTHER PUBLICATIONS

Pacifici et al., "Performance Management for Cluster Based Web Services" in IFIP/IEEE Eighth International Symposium on Integrated Network Management volume, pp. 1-17, May 13, 2003.

Villela et al., "Provisioning Servers in the Application Tier for E-Commerce Systems" ACM Transactions on Internet Technology, vol. 7, No. 1, Article 7, Feb. 2007. pp. 1-23.

Urgaonkar et al., "An Analytical Model for Multi-tier Internet Services and Its Applications" Sigmetrics 2005, 13 unnumbered pages.

Bennani et al., "Resource Allocation for Autonomic Data Centers Using Analytic Performance Models" IEEE Conf. Jun. 13-16, 2005, 12 unnumberd pages.

Liu et al., "Adaptive Entitlement Control of Resource Containers on Shared Servers" 2005 IEEE, 14 unnumbered pages.

Padala at al., "Adaptive Control of Virtualized Resources in Utility Computing Environments" in Proceedings of the $2^{nd}$ ACM SIGOPS/EuroSys European Conference on Computer Systems 2007, 14 unnumbered pages.

Ipek et al., "Efficiently Exploring Architectural Design Spaces via Predictive Modeling" ACSPLOS '06, Oct. 21-25, 2006, pp. 195-206.

Lee et al., "Accurate and Efficient Regression Modeling for Microarchitectural Performance and Power Prediction" ACSPLOS '06, Oct. 21-25, 2006, 10 unnumberd pages.

Lee et al., "Illustrative Design Space Studies with Microarchitectural Regression Models" Proc. of the IEEE 2007 International Symposium on High Performance Computer Architecture, Feb. 2007. 12 unnumbered pages.

Stewart et al., "A Dollar from 15 Cents: Cross Platform Management for Internet Services" in proceedings of the USENIX Annual Annual Technical Conference, 14 unnumbered pages.

Katramatos et al., "A Cost/Benefit Estimating Service for Mapping Parallel Applications on Heterogeneous Clusters" IEEE International Conference on Cluster Computing 2005, 12 unnumbered pages.

Peter A. Dinda, "Online Prediction of the Running Time of Tasks" 2001 Kluwer Academic Publishers. p. 1-28.

Stewart et al., "Performance Modeling and System Management for Multi-Component Online Services" Proc of the $2^{nd}$ USENIX NSDI, 2005. 14 unnumbered pages.

Dinaburg et al., "Ether: Malware Analysis via Hardware Virtualization Extensions" ACM CCS'08 Oct. 27-31, 2008.

\* cited by examiner

MODELING AND EVALUATING APPLICATION PERFORMANCE IN A NEW ENVIRONMENT

BACKGROUND OF THE INVENTION

The present invention relates generally to data migration and relates more specifically to the migration of distributed, complex multi-tier applications.

FIG. 1 is a block diagram illustrating an exemplary distributed, complex multi-tier application ("Target Application") operating in a first environment ("Environment A"). As illustrated, a distributed, complex multi-tier application is an application in which presentation, application processing, and data management are performed as logically separate processes over multiple cooperating servers (e.g., "Servers A-D"). These servers might include, for example, one or more hypertext transfer protocol (HTTP) servers, application servers, and/or relational database management systems.

When a distributed, complex multi-tier application is to be migrated to a new environment (e.g., a cloud environment), it is often difficult to estimate the resources necessary to ensure that the application's performance in the new environment matches its performance in the old environment. It is also non-trivial to project the application's performance for workloads that are heavier than those it has already encountered. For instance, in FIG. 1, Environment A has access to a first set of resources including, but not limited to, processing, memory, and hardware resources. Supported by the first set of resources, the Target Application may be capable of processing fifty-eight requests per second. However, it is unknown what the Target Application's performance might be if the Target Application were to be migrated to Environment B, which has access to a different, second set of resources.

Although the Target Application could be directly installed in Environment B and evaluated accordingly, this approach is not ideal for several reasons. For one, installation is complicated by the subtle interdependencies between the application tiers, potentially complex configurations, and application specific treatments. Moreover, it is costly and labor-intensive to migrate and store all of the data associated with a distributed, complex multi-tier application. Finally, if the Target Application is to be migrated to multiple new environments, all of the above complications will apply in each new environment.

SUMMARY OF THE INVENTION

A method for evaluating the performance of an application when migrated from a first environment in which the target application is currently executing to a second, different environment includes generating a virtual application that mimics the resource consuming behavior of the application, executing the virtual application in the second environment, and evaluating the performance of the virtual application in the second environment.

BRIEF DESCRIPTION OF THE DRAWINGS

So that the manner in which the above recited features of the present invention can be understood in detail, a more particular description of the invention may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In one embodiment, the invention is a method and apparatus for evaluating application performance in a new environment. Embodiments of the invention generate a virtual application that mimics a target application (e.g., a distributed, complex multi-tier application) and can be executed in a new environment in order to estimate the target application's performance in the new environment. In one embodiment, the virtual application comprises one or more components or "drones" that are dynamically configured to consume the same amount of resources as the target application. Thus, the terms "virtual application" and "drone" or "drones" may be used interchangeably herein to refer to entities that are configured to consume a specified amount of resources based on the resource usage of a target application.

Figure 1:
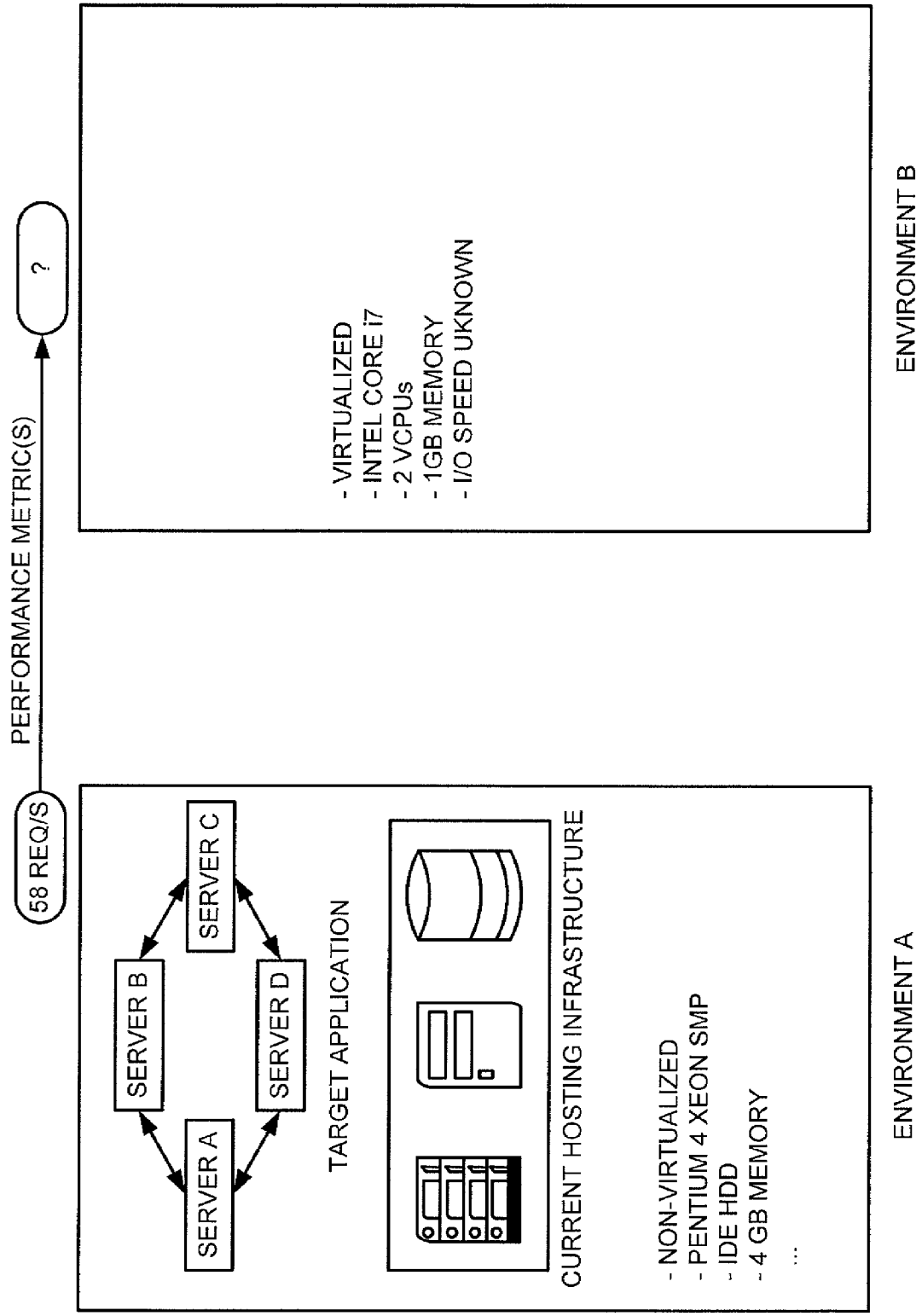
FIG. 1 is a block diagram illustrating an exemplary distributed, complex multi-tier application operating in a first environment.
Figure 2:
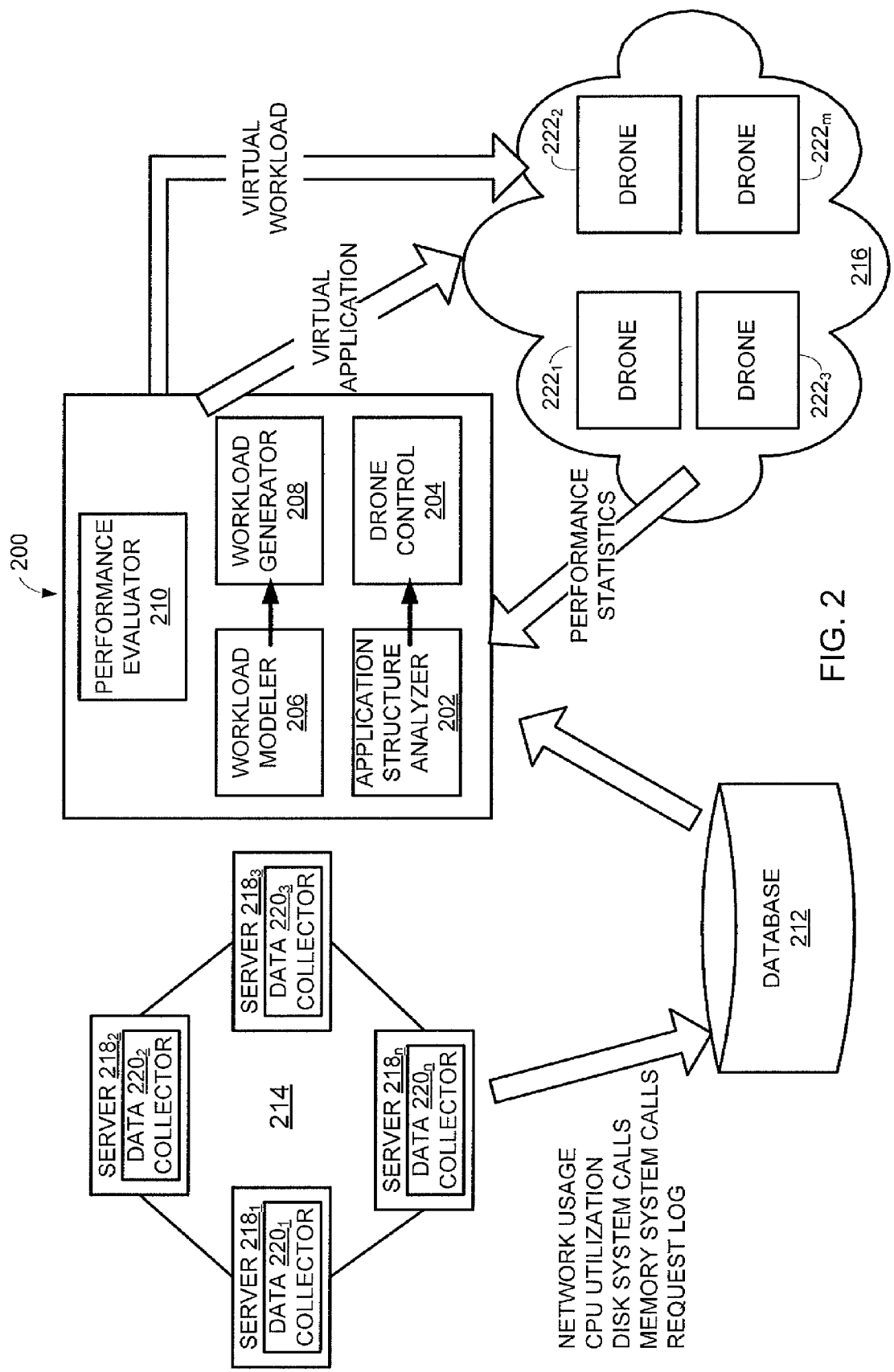
FIG. 2 is a block diagram illustrating one embodiment of a system for evaluating the performance of a target application in a new environment, according to the present invention.

FIG. 2 is a block diagram illustrating one embodiment of a system 200 for evaluating the performance of a target application in a new environment, according to the present invention.

As illustrated, the system 200 generally comprises a plurality of components, including: an application structure analyzer 202, a drone control module 204, a workload modeler 206, a workload generator 208, and a performance evaluator 210. The operations of each of these components 202-210 are discussed in greater detail below. Although each of these components 202-210 is illustrated as a discrete component, it will be appreciated that one or more of these components 202-210 may be combined into a single component that performs multiple tasks. Moreover, any one of these components 202-210 may be further split into two or more smaller components that perform a subset of the tasks performed by the larger component. Any of the components 202-210 may comprise a hardware processor (e.g., a central processing unit, co-processor, or specialized processor).

The system 200 is coupled to a database 212, which stores data related to a target application 214. In one embodiment, the target application 214 comprises a distributed, complex multi-tier application that is to be migrated to a new environment 216. Thus, the target application 214 comprises a plurality of servers $218_1$-$218_n$ (hereinafter collectively referred to as "servers 218") that cooperate to perform presentation, application processing, and data management, among potentially other tasks. In one embodiment, each of the servers 218 further includes a data collection agent or data collector $220_1$-$220_n$ (hereinafter collectively referred to as "data collectors 220"). In one embodiment, the data collectors are integrated with the hypervisors associated with each of the servers 218.

In operation, the data collectors 220 collect data from the servers 218. The collected data represents the target application's resource usage, internal threading structure, and/or transaction paths. In one embodiment, the collected data specifically includes one or more of the following: the target application's network usage, the target application's central processing unit (CPU) utilization, the target application's disk system calls, the target application's memory system calls, and the target system's request log (which may, in turn, include the target application's threading structure). The collected data is stored in the database 212.

As discussed above, the database 212 is accessible by the system 200, and the various components 202-210 of system 200 operate on the collected data in different ways. For instance, the application structure analyzer 202 uses the data relating to the target application's resource usage, internal threading structure, and/or transaction paths to produce a model of the target application 214. Within the context of the present invention, the term "resource usage" is understood to refer to an application's consumption of central processing unit (CPU) cycles, input/output (I/O) bandwidth, and/or storage space. The term "internal threading structure" is understood, within the context of the present invention, to refer to an application's number of active threads, the roles assigned to each active thread, and/or the patterns in which the active threads are created and destroyed. The term "transaction path" is understood, within the context of the present invention, to refer to the end-to-end trails of user messages that travel across multiple server processes (i.e., starting at an initial request and ending at a final reply message).

The drone control module 204 then generates a "virtual application" based on this model. The virtual application comprises a plurality of drones $222_1$-$222_m$ (hereinafter collectively referred to as "drones 222") that mimic the resource consuming behavior of the target application 214. There need not necessarily be a one-to-one correspondence between the number of servers 218 in the target application 214 and the number of drones 222 in the virtual application. The drone control module 204 deploys and controls the operation of the drones 222 in the new environment 216.

In addition, the workload modeler 206 uses data relating to the target application's workload (e.g., request logs) to produce a model of the workload. The workload generator 208 then uses the workload model to generate a "virtual workload" that mimics the actual workload of the target application 214.

The performance evaluator 210 collects data from the new environment 216 relating to the performance statistics of the virtual application. In particular, the performance statistics relate to the processing of the virtual workload by the virtual application. The performance evaluator 210 evaluates this data in accordance with one or more metrics in order to estimate how the target application 214 will perform in the new environment 216.

Figure 3:
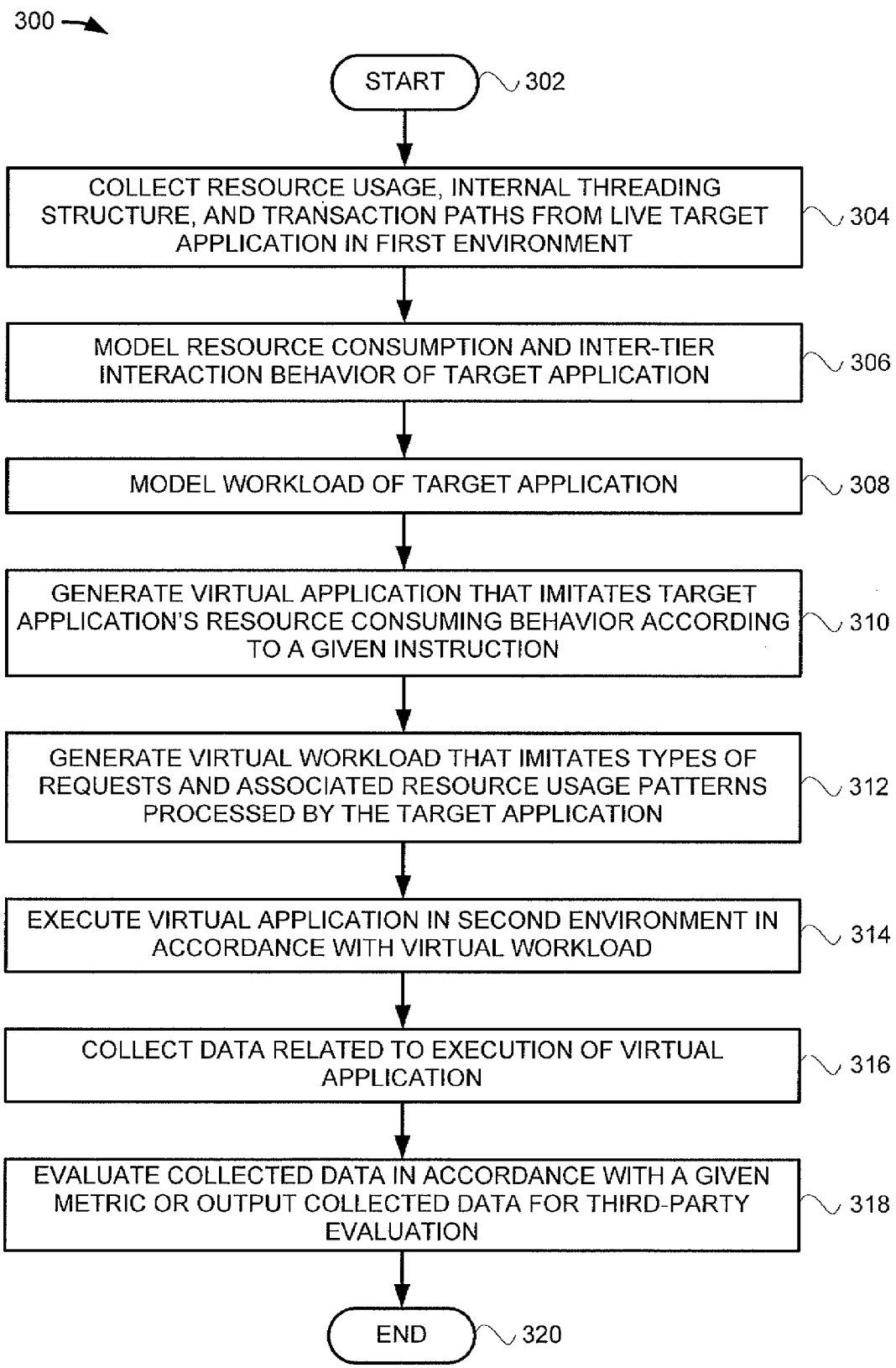
FIG. 3 is a flow diagram illustrating one embodiment of a method for evaluating the performance of a target application in a new environment, according to the present invention.

FIG. 3 is a flow diagram illustrating one embodiment of a method 300 for evaluating the performance of a target application in a new environment, according to the present invention. The method 300 may be performed, for example, by the system 200 illustrated in FIG. 2. As such, reference is made in the discussion of the method 300 to various elements depicted in FIG. 2. However, it will be appreciate that the method 300 may also be performed by systems having alternate configurations.

The method 300 begins at step 302 and proceeds to step 304, where data is collected (e.g., by the data collectors 220) from a live target application executing in a first environment. The target application is "live" in the sense that it is deployed and functioning in the first environment. In one embodiment, the target application is a distributed, complex multi-tier application. In this embodiment, the target application performs presentation, application processing, and data management as logically separate processes over multiple cooperating servers (e.g., HTTP servers, application servers, and/or relational database management systems).

In one embodiment, the collected data includes the target application's resource usage, internal threading structure, and/or transaction paths. In one embodiment, the internal threading structure includes the number of threads and changes to threads over time as processed by the target application.

In one embodiment, the transaction paths are constructed from partial transaction paths reported by the data collectors 220. For instance, from the data reported by the data collectors 220 associated with three different servers, a complete transaction path through the three servers may be constructed.

In one embodiment, the resource usage includes the CPU, disk input/output (I/O), and memory consumed per thread of the target application. For instance, the method 200 might count the number of CPU cycles between read/write system calls (e.g., using a time stamp counter) and determine whether this count will be stable across the CPU architecture. Different access types will require different numbers of CPU cycles. For instance, reading a register, reaching a level 1 (L1) cache, reaching a level 2 (L2) cache, reaching a level 3 (L3) cache, and reading a main memory will all require varying numbers of CPU cycles. In further embodiments, the method 300 counts the number of CPU cycles between other types of system calls and interrupts (e.g., user-kernel crossings). Memory access latency may be a non-negligible factor under these circumstances.

The memory footprint and resident set size may also be relevant in step 304, as they directly relate to buffer cache behavior. Thus, in one embodiment, break (brk) system calls may be tracked and/or related to the number of threads and memory size. In a further embodiment, the number of pages touched by the target application during particular stages of operation is tracked. For instance, the number of pages touched during thread context switches (e.g., per CPU) may be tracked by the method 300.

In step 306, the resource consumption and inter-tier behavior of the target application are modeled (e.g., by the application structure analyzer 202). In one embodiment, the per-transaction-step resource consumption of the target application in particular is modeled. The per-transaction-step resource consumption may include, for example, one or more of: the number of required CPU cycles, the number of main memory read requests, the number of main memory write requests, the number of disk read requests, the number of disk write requests, the amount of data (e.g., number of bytes) received over a network interface card, or the amount of data sent over a network interface card associated with a given transaction step.

In step 308, the workload of the target application is modeled (e.g., by the workload modeler 206). In one embodiment, modeling the workload includes identifying the types of requests that are processed by the target application and the resource usage patterns associated with these types of requests.

In step 310, a virtual application is generated (e.g., by the drone control module 204). The virtual application mimics the application structure (e.g., communications between servers and how the communications travel) and resource usage patterns (e.g., CPU cycles per memory access) of the target application. Although the virtual application may produce an exact replay of the target application's resource access history, this is not always the case. In alternate embodiments, statistical modeling may be used to produce a virtual application whose behavior is qualitatively identical to the target application's behavior. For instance, a read/write probability of the target application may be translated in the virtual application into files with the same number and sizes as in the first environment. As a further example, an I/O size distribution associated with the target application may be translated in the virtual application into two distributions.

In one embodiment, the application structure that is mimicked includes the threading structure (e.g., number of threads and changes to threads over time) of the target application. In one embodiment, the resource usage patterns that are mimicked include the CPU, disk I/O, and memory consumed per thread of the target application.

As discussed above, the virtual application comprises one or more drones that mimic the target application. For example, each drone may mimic a particular server that is part of the target application. In one embodiment, the drones are dynamically configured to consume the same amount of resources and create the same number of threads as the servers of the target application. For instance, in one embodiment, initial system calls and RSS runtime changes associated with the target application are mimicked by the virtual application. In a further embodiment, the virtual application mimics the paging (I/O) behavior of the target application. For instance, each thread associated with the virtual application may be configured to touch a number of pages observed being touched by the live target application during a thread context switch.

In step 312, a virtual workload is generated (e.g., by the workload generator 208). The virtual workload relies on the workload model generated in step 308 to produce a virtual workload of varying intensity and request types that realistically mimics the actual workload of the target application.

In step 314, the virtual application is executed in a second environment, different from the first environment. In one embodiment, the virtual application is executed in accordance with the virtual workload. Thus, the virtual application will process synthesized data (the virtual workload) by consuming resources that are substantially equal to the resources consumed by the target application when processing real workloads.

In step 316, data related to execution of the virtual application in the second environment is collected. In step 318, the collected data is either evaluated in accordance with a given metric (e.g., by the performance evaluator 21) or output to a third party for evaluation. The given metric might include, for example, a target throughput or target response time (e.g., average response time) of the target application in the new environment.

The method 300 ends in step 320.

In some embodiments, one or more steps of the method 300 are repeated in order to compensate for variability in hardware and/or software performance. For instance, when the virtual workload is generated, the degree of sequentiality of the block layout of the dummy files (which are used by the drones to emulate the disk input/output) may vary depending on the conditions of the current target disks, and the sequentiality of the file blocks can greatly affect application performance. The disk input/output (I/O) performance may also vary depending on the physical locations of the file blocks (e.g., outer rim of the disk versus closer to the center of the disk) and on the disk's internal cache states (which are not shown or controllable by user-level applications). Thus, data relating to the execution of the virtual application in the second environment may need to be collected and evaluated multiple times in order to absorb variances such as those discussed.

The virtual application that is generated and executed according to the method 300 allows one to analyze the performance of a target application in a new environment without having to actually deploy the target application in the new environment. Thus, a tremendous amount of time and resources may be conserved. Moreover, the analysis produced according to the method 300 is more accurate than conventional mathematical modeling approaches that require modeling of hardware and non-trivial modeling of hypervisors.

Furthermore, the method 300 is capable of measuring the target application's performance in connection with workloads that were not encountered during the profiling of the target application (e.g., steps 304-312). If the target environment should change, it is likely that the workload of the target application will also change. The method 300 may thus be implemented to measure the performance of the target application for hypothetical (i.e., not observed) workloads as well as real (i.e., observed) workloads. This allows one to test the scalability of the target application in the new environment.

Moreover, the method 300 can be implemented to measure the performance of the target workload when one or more components of the target application are hypothetically replaced with components that behave differently and/or have different performance characteristics. For example, the method 300 may have access to profiling data for a MYSQL database and a POSTGRESQL database. Then, even if the method 300 has only profiled and modeled an application that uses a MYSQL database, a corresponding virtual application may be constructed that includes a database part that follows the resource usage patterns of a POSTGRESQL database. Performance data for this virtual application may help determine whether the MYSQL database of the target application should be replaced with another type of database in the new environment.

Figure 4:
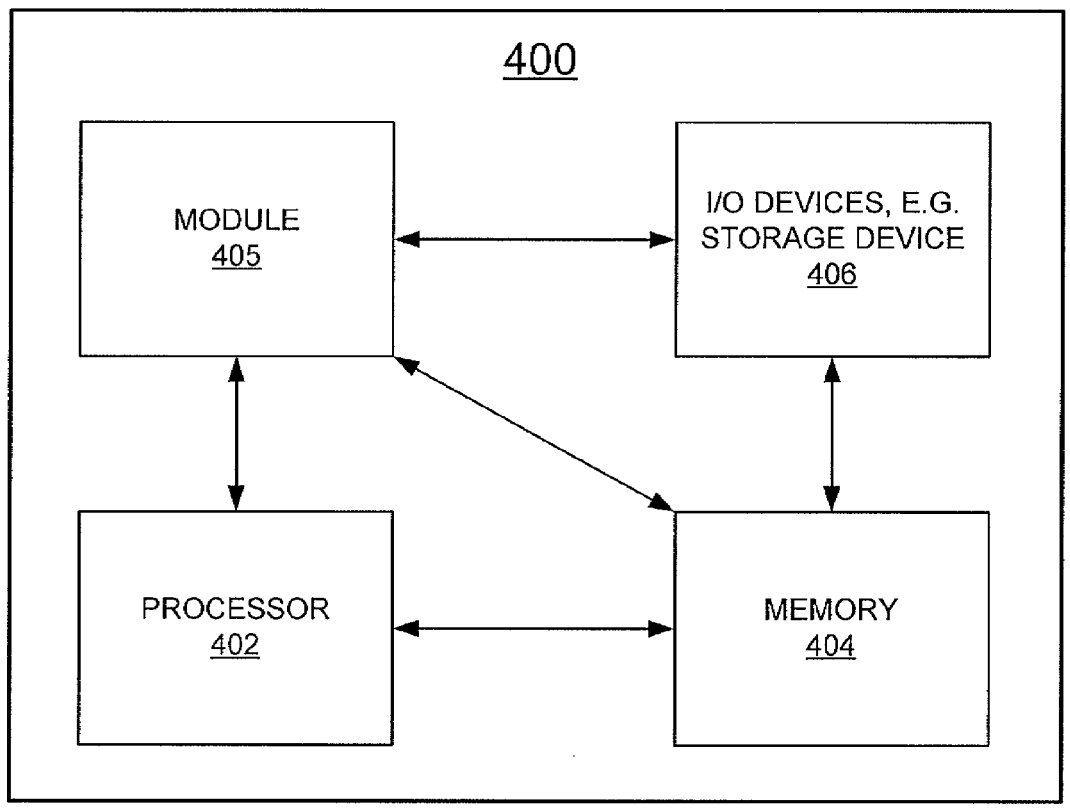
FIG. 4 is a high-level block diagram of the performance evaluation method that is implemented using a general purpose computing device.

FIG. 4 is a high-level block diagram of the performance evaluation method that is implemented using a general purpose computing device 400. In one embodiment, a general purpose computing device 400 comprises a processor 402, a memory 404, a performance evaluation module 405 and various input/output (I/O) devices 406 such as a display, a keyboard, a mouse, a stylus, a wireless network access card, an Ethernet interface, and the like. In one embodiment, at least one I/O device is a storage device (e.g., a disk drive, an optical disk drive, a floppy disk drive). It should be understood that the performance evaluation module 405 can be implemented as a physical device or subsystem that is coupled to a processor through a communication channel.

Alternatively, the performance evaluation module 405 can be represented by one or more software applications (or even a combination of software and hardware, e.g., using Application Specific Integrated Circuits (ASIC)), where the software is loaded from a storage medium (e.g., I/O devices 406) and operated by the processor 402 in the memory 404 of the general purpose computing device 400. Thus, in one embodiment, the performance evaluation module 405 for evaluating application performance in a new environment, as described herein with reference to the preceding figures, can be stored on a computer readable storage medium (e.g., RAM, magnetic or optical drive or diskette, and the like).

It should be noted that although not explicitly specified, one or more steps of the methods described herein may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in the accompanying figures that recite a determining operation or involve a decision, do not necessarily require that both branches of the determining operation be practiced. In other words, one of the branches of the determining operation can be deemed as an optional step.

While the foregoing is directed to embodiments of the present invention, other and further embodiments of the invention may be devised without departing from the basic scope thereof. Various embodiments presented herein, or portions thereof, may be combined to create further embodiments. Furthermore, terms such as top, side, bottom, front, back, and the like are relative or positional terms and are used with respect to the exemplary embodiments illustrated in the figures, and as such these terms may be interchangeable.

What is claimed is:

1. A method for evaluating a performance of a distributed, complex multi-tier application when migrated from a first environment in which the distributed, complex multi-tier application is currently executing to a second, different environment, the method comprising:
    collecting data indicative of a resource-consuming behavior and an inter-tier behavior of the distributed, complex multi tier application, wherein the data comprises data indicative of at least one of: a role assigned to an active thread of the distributed, complex multi tier application or a pattern in which an active thread of the distributed, complex multi tier application is created and destroyed;
    generating a virtual application that mimics the resource consuming behavior and an inter-tier behavior of the distributed, complex multi-tier application, based at least in part on the data, wherein the virtual application further mimics system calls and resident set size runtime changes observed in the distributed, complex multi-tier application;
    executing the virtual application in the second environment; and
    evaluating a performance of the virtual application in the second environment,
    wherein at least one of: the generating, the executing, or the evaluating is performed by a processor.

2. The method of claim 1, wherein the generating comprises:
    producing a model of the resource consuming behavior; and
    deploying one or more drones in the second environment, where the one or more drones consume resources according to the model.

3. The method of claim 2, wherein the one or more drones consume an amount of resources equal to an amount of resources consumed by the distributed, complex multi-tier application.

4. The method of claim 1, wherein the data further comprises a central processing unit utilization of the distributed, complex multi-tier application.

5. The method of claim 1, wherein the data further comprises a disk input/output of the distributed, complex multi-tier application.

6. The method of claim 1, wherein the data further comprises an amount of memory consumed per thread of the distributed, complex multi-tier application.

7. The method of claim 1, wherein the data further comprises a number of threads processed by the distributed, complex multi-tier application.

8. The method of claim 1, wherein the data further comprises a change over time to a thread processed by the distributed, complex multi-tier application.

9. The method of claim 1, wherein the one or more drones create a number of threads equal to a number of threads created by the distributed, complex multi-tier application.

10. The method of claim 1, wherein the data further comprises data indicative of a transaction path of the distributed, complex multi-tier application while the application is live, wherein the transaction path comprises an end-to-end trail of messages that travels across multiple servers of the application, and wherein components of the virtual application communicate with each other according to a model of the transaction path.

11. The method of claim 1, wherein the executing the virtual application in the second environment comprises:
    processing a virtual workload by the virtual application, wherein the virtual workload mimics an intensity and a mix of request types reflected in an actual workload of the distributed, complex multi-tier application.

12. The method of claim 11, wherein the processing the virtual workload comprises:
    replaying, by the virtual application, a resource access history of the distributed, complex multi-tier application.

13. The method of claim 12, wherein a resource access history of the virtual application is identical to a resource access history of the distributed, complex multi-tier application according to a statistical model.

14. The method of claim 1, wherein the virtual application is executed in the second environment without executing the distributed, complex multi-tier application in the second environment.

15. The method of claim 1, further comprising:
    repeating the collecting, the generating, the executing, and the evaluating in order to absorb variances in a performance of the distributed, complex multi-tier application.

16. The method of claim 1, wherein the resource consuming behavior is a hypothetical resource consuming behavior.

17. The method of claim 1, wherein the plurality of servers performs presentation, application processing, and data management for the distributed, complex multi-tier application as logically separate processes over the plurality of servers.

18. The method of claim 1, wherein the data further comprises a number of pages in memory that are touched by the distributed, complex multi tier application during a thread context switch, and wherein a thread of the virtual application is configured to touch the number of pages.

19. A system for evaluating a performance of a distributed, complex multi-tier application when migrated from a first environment in which the distributed, complex multi-tier application is currently executing to a second, different environment, the system comprising:
    a data collector for collecting data indicative of a resource-consuming behavior and an inter-tier behavior of the distributed, complex multi tier application, wherein the data comprises data indicative of at least one of: a role assigned to an active thread of the distributed, complex multi tier application or a pattern in which an active thread of the distributed, complex multi tier application is created and destroyed;
    an application structure analyzer for generating a virtual application that mimics the resource consuming behavior and an inter-tier behavior of the distributed, complex multi-tier application, based at least in part on the data, wherein the virtual application further mimics system calls and resident set size runtime changes observed in the distributed, complex multi-tier application;
    a drone control module for executing the virtual application in the second environment; and a performance evaluator for evaluating a performance of the virtual application in the second environment.

20. An apparatus comprising a non-transitory computer readable storage medium containing an executable program for evaluating a performance of a distributed, complex multi-tier application when migrated from a first environment in which the distributed, complex multi-tier application is currently executing to a second, different environment, where the program performs steps comprising:

collecting data indicative of a resource-consuming behavior and an inter-tier behavior of the distributed, complex multi tier application, wherein the data comprises data indicative of at least one of: a role assigned to an active thread of the distributed, complex multi tier application or a pattern in which an active thread of the distributed, complex multi tier application is created and destroyed;

generating a virtual application that mimics the resource consuming behavior and an inter-tier behavior of the distributed, complex multi-tier application, based at least in part on the data, wherein the virtual application further mimics system calls and resident set size runtime changes observed in the distributed, complex multi-tier application;

executing the virtual application in the second environment; and evaluating a performance of the virtual application in the second environment.

* * * * *